United States Patent
Sankhgond

(10) Patent No.: US 9,845,986 B2
(45) Date of Patent: Dec. 19, 2017

(54) LIGHTING UNITS FOR REFRIGERATOR DRAWERS AND BASKETS

(71) Applicant: Whirlpool Corporation, Benton Harbor, MI (US)

(72) Inventor: Basavraj Ishwar Sankhgond, Evansville, IN (US)

(73) Assignee: Whirlpool Corporation, Benton Harbor, MI (US)

( * ) Notice: Subject to any disclaimer, the term of this patent is extended or adjusted under 35 U.S.C. 154(b) by 418 days.

(21) Appl. No.: 14/187,484

(22) Filed: Feb. 24, 2014

(65) Prior Publication Data

US 2015/0241119 A1    Aug. 27, 2015

(51) Int. Cl.
| | |
|---|---|
| F25D 27/00 | (2006.01) |
| F21V 5/04 | (2006.01) |
| F21V 23/00 | (2015.01) |
| F21V 33/00 | (2006.01) |
| F25D 25/00 | (2006.01) |
| F21V 8/00 | (2006.01) |
| F25D 25/02 | (2006.01) |
| F21W 131/305 | (2006.01) |
| F21Y 103/10 | (2016.01) |
| F21Y 115/10 | (2016.01) |

(52) U.S. Cl.
CPC ............ *F25D 27/005* (2013.01); *F21V 5/04* (2013.01); *F21V 23/003* (2013.01); *F21V 23/005* (2013.01); *F21V 33/0044* (2013.01); *F25D 25/005* (2013.01); *F25D 25/022* (2013.01); *F25D 25/025* (2013.01); *F25D 27/00* (2013.01); *G02B 6/0001* (2013.01); *F21W 2131/305* (2013.01); *F21Y 2103/10* (2016.08); *F21Y 2115/10* (2016.08); *F25D 25/02* (2013.01)

(58) Field of Classification Search
CPC ...... F25D 25/02; F25D 25/024; F25D 25/025; F25D 27/005
USPC ........................................ 362/92, 94; 62/264
See application file for complete search history.

(56) References Cited

U.S. PATENT DOCUMENTS

| | | | |
|---|---|---|---|
| 5,437,503 A * | 8/1995 | Baker et al. .................. | 312/404 |
| 5,873,646 A | 2/1999 | Fjaestad et al. | |
| 7,107,779 B2 * | 9/2006 | Avenwedde et al. ........... | 62/264 |
| 7,147,341 B2 | 12/2006 | Nowak et al. | |
| 7,712,852 B2 | 5/2010 | Choi et al. | |
| 8,002,434 B2 | 8/2011 | Sommers et al. | |
| 8,152,255 B2 | 4/2012 | Nam et al. | |

(Continued)

FOREIGN PATENT DOCUMENTS

| | | |
|---|---|---|
| CN | 2861901 U | 1/2007 |
| CN | 2881489 U | 3/2007 |

(Continued)

*Primary Examiner* — Sean Gramling
*Assistant Examiner* — Gerald J Sufleta, II
(74) *Attorney, Agent, or Firm* — Diederiks & Whitelaw, PLC

(57) ABSTRACT

Lighting units for refrigerator drawers and baskets are disclosed. An example refrigerator drawer assembly includes a shelf having a divider, the shelf defining at least a portion of a drawer compartment, first and second drawers disposed beneath the shelf, an elongated light source attached to a bottom surface of the divider, the elongated light source having a plurality of light-emitting diodes (LEDs) along the length of the elongated light source to provide a source of visible light for the first and second drawers.

20 Claims, 11 Drawing Sheets

(56) References Cited

U.S. PATENT DOCUMENTS

| | | |
|---|---|---|
| 8,291,816 B2 | 10/2012 | Iwamoto et al. |
| 8,780,295 B2 | 7/2014 | Yang |
| 8,864,250 B2 | 10/2014 | Anderson et al. |
| 2002/0171335 A1 | 11/2002 | Held |
| 2006/0042300 A1 | 3/2006 | Kim |
| 2007/0180843 A1* | 8/2007 | Park .................. A23L 3/26 62/264 |
| 2008/0236183 A1* | 10/2008 | Iimura ........................ 62/264 |
| 2008/0307818 A1* | 12/2008 | Min et al. .................. 62/264 |
| 2009/0277210 A1* | 11/2009 | Eveland .............. F25D 11/02 62/441 |
| 2010/0170279 A1* | 7/2010 | Aoki ................... F25D 11/02 62/264 |
| 2010/0175404 A1 | 7/2010 | Kim |
| 2010/0175405 A1 | 7/2010 | Lee et al. |
| 2010/0320890 A1 | 12/2010 | Jung et al. |
| 2012/0133262 A1* | 5/2012 | Grutzke et al. ............... 312/406 |
| 2012/0230015 A1* | 9/2012 | Zhu et al. ..................... 362/94 |
| 2012/0312798 A1 | 12/2012 | Aoki |
| 2013/0059047 A1* | 3/2013 | Arrigo ........................ 426/320 |
| 2013/0104579 A1* | 5/2013 | Zhou ............................. 62/89 |
| 2014/0016298 A1* | 1/2014 | Lind et al. ................ 362/23.14 |
| 2014/0060095 A1* | 3/2014 | Shur .................... A61L 2/10 62/129 |

FOREIGN PATENT DOCUMENTS

| | | |
|---|---|---|
| CN | 101240974 A | 8/2008 |
| CN | 101449123 | 6/2009 |
| CN | 101543240 | 9/2009 |
| CN | 101858682 A | 10/2010 |
| CN | 201697425 U | 1/2011 |
| CN | 201844649 U | 5/2011 |
| CN | 102113543 A | 7/2011 |
| CN | 201954912 U | 8/2011 |
| CN | 203274426 | 11/2013 |
| DE | 102007062004 A1 | 6/2009 |
| DE | 102010040360 | 3/2012 |
| EP | 2385332 A1 | 9/2011 |
| JP | 5256565 A | 10/1993 |
| JP | H611251 A | 1/1994 |
| JP | 2006132877 A | 5/2006 |
| JP | 2008020121 A | 1/2008 |
| KR | 101052837 | 7/2011 |
| WO | 2012100449 A1 | 8/2012 |

* cited by examiner

LIGHTING UNITS FOR REFRIGERATOR DRAWERS AND BASKETS

FIELD OF THE DISCLOSURE

This disclosure relates generally to refrigerators, and, more particularly, to lighting units for refrigerator drawers and baskets.

BACKGROUND

Most refrigerators have one or more drawers and/or baskets that facilitate the storage of items, such as food items. Refrigerator drawers and baskets have an open top face that allow a person to place items in the drawers and/or baskets, and remove items from the drawers and/or baskets. When a drawer and/or basket is in a closed position, the open top face of the drawer and/or basket may be closed by a shelf positioned above the drawer and/or basket, the bottom of another drawer and/or basket, and/or any other structure(s) of the refrigerator such as an inner liner and/or interior partition.

SUMMARY

Lighting units for refrigerator drawers and baskets are disclosed. An example refrigerator drawer assembly includes a shelf having a divider, the shelf defining at least a portion of a drawer compartment, first and second drawers disposed beneath the shelf, an elongated light source attached to a bottom surface of the divider, the elongated light source having a plurality of light-emitting diodes (LEDs) along the length of the elongated light source to provide a source of visible light for the first and second drawers.

DETAILED DESCRIPTION

In some prior-art refrigerators, drawers and baskets are not lighted, which may impair a user's ease of seeing items that are in the drawers and baskets. In some prior-art refrigerators, lighting inside the refrigerator is mounted high in the refrigerator to provide general illumination within the refrigerator and, thus, may not adequately illuminate the insides of drawers and/or baskets. To overcome at least these problems, lighting units that provide adequate and/or quality illumination for storage containers (e.g., crisper drawers, meat drawers, produce drawers, freezer baskets, etc.) are disclosed.

Figure 1:
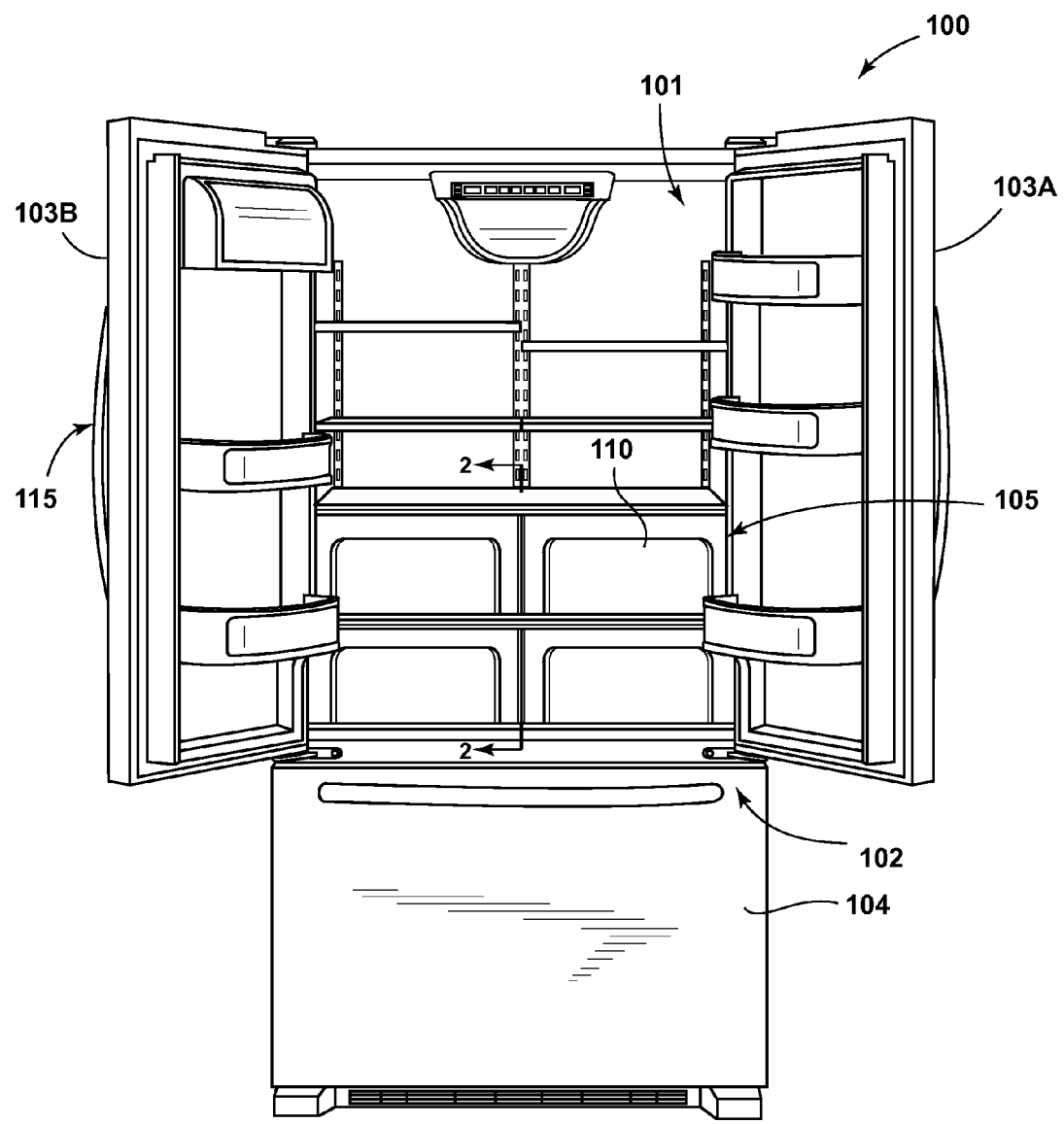
FIG. 1 is a perspective drawing of an example refrigerator having a drawer assembly including a lighting unit in accordance with the teachings of this disclosure.

FIG. 1 illustrates an example refrigerator 100 having a refrigerated compartment 101 and a freezer compartment 102. The refrigerated compartment 101 and the freezer compartment 102 each have an open face to provide access to the compartments 101 and 102. The refrigerator 100 includes doors 103A and 103B, and a drawer 104 moveably mounted to the refrigerator 100 for movement between opened and closed positions to selectively open and close the open faces of the compartments 101 and 102.

To allow food to be stored at different humidities and/or temperatures, the example refrigerator 100 includes a refrigerator drawer stack 105 having one or more drawers (one of which is designated at reference numeral 110). As discussed below in connection with FIGS. 2-13, the refrigerator drawer stack 105 includes at least one lighting unit to illuminate one or more of the drawers 110 thereby facilitating the better viewing of objects in the drawer stack 105 when the drawers 110 are closed.

To enable a person to adjust one more properties of the visible light provided by the disclosed lighting unit, the example refrigerator 100 includes a user interface 115 (not shown). The user interface 115 may be, for example, included in a control panel associated with a water and/or ice dispenser. The user interface 115 may be used to control, among other things, the color and/or intensity of the visible light provided by the lighting unit. For example, the lighting may be configured to provide mood lighting.

Although the example lighting units disclosed herein are described with reference to the example refrigerator 100 and the example drawer stack 105, one of ordinary skill in the art will readily appreciate that the lighting units disclosed herein may be used to provide lighting for other storage containers in a refrigerator (e.g., in a freezer basket, a crisper drawer, a meat drawer, a produce drawer, etc.), in refrigerators having other configurations (e.g., a side-by-side refrigerators, a top-freezer refrigerators, etc.), and/or in any other appliances including, but not limited to, a freezer, a washing machine, a dryer, a stove, a microwave, a dishwasher, etc.

Figure 2:
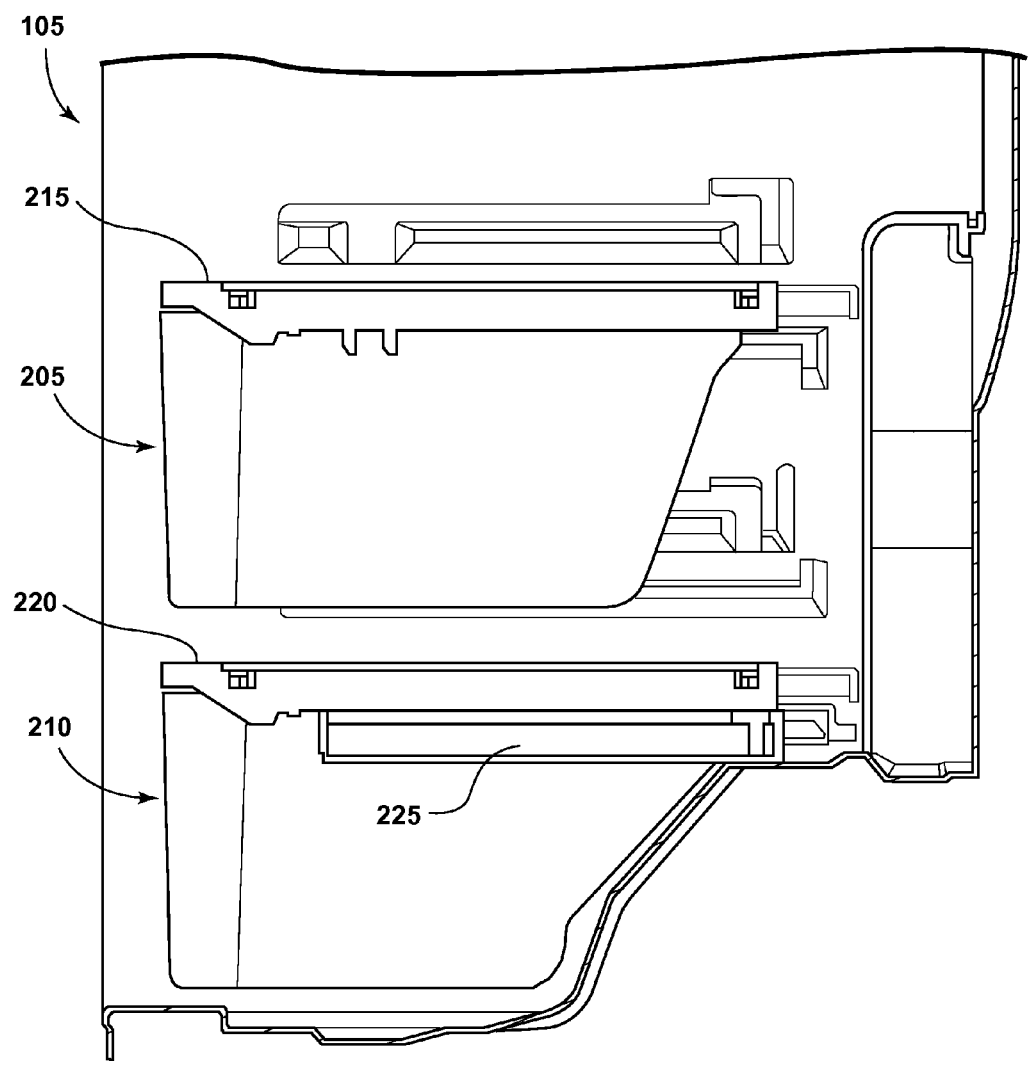
FIG. 2 is a side cross-sectional view of a lower portion of the example refrigerator of FIG. 1 taken along line 2-2 of FIG. 1.

FIG. 2 illustrates a side cross-sectional view of the example drawer stack 105 of FIG. 1 taken along line 2-2 of FIG. 1. As shown in FIG. 2, the drawer stack 105 includes upper drawers 205 and lower drawers 210. In the illustrated example of FIG. 2, upper open surfaces of the upper and lower drawers 205 and 210 are closed by respective shelves 215 and 220. An elongated lighting unit 225 extends downward from the shelf 220 to provide visible light for the lower drawers 210. The lighting unit 225 will be described below in more detail in connection with FIGS. 6-9. While FIG. 2 only depicts lighting in connection with the lower drawers 210, it will be understood by persons of ordinary skilling in the art that lighting could also be provided for the upper drawers 205.

Figure 3:
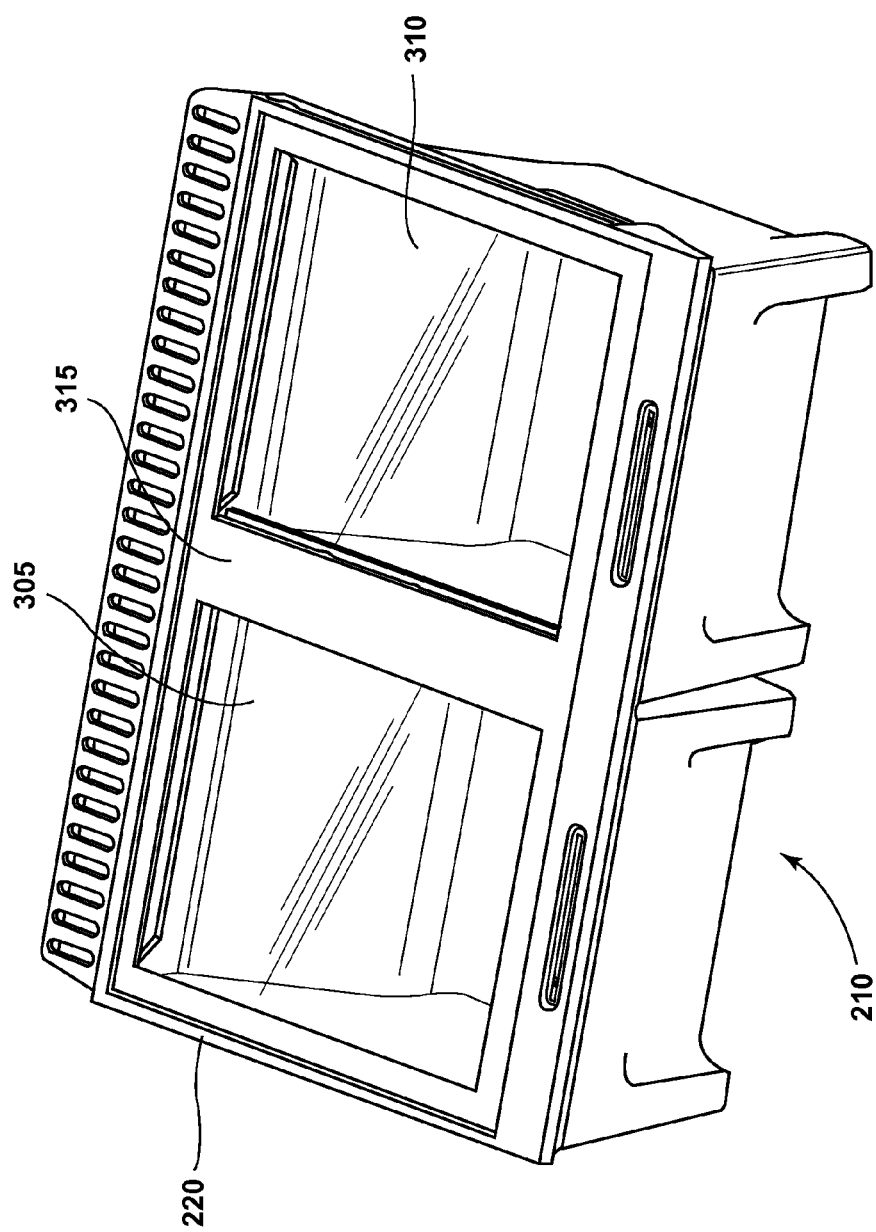
FIG. 3 is an isometric view of an example drawer assembly for the example refrigerator of FIG. 1.
Figure 4:
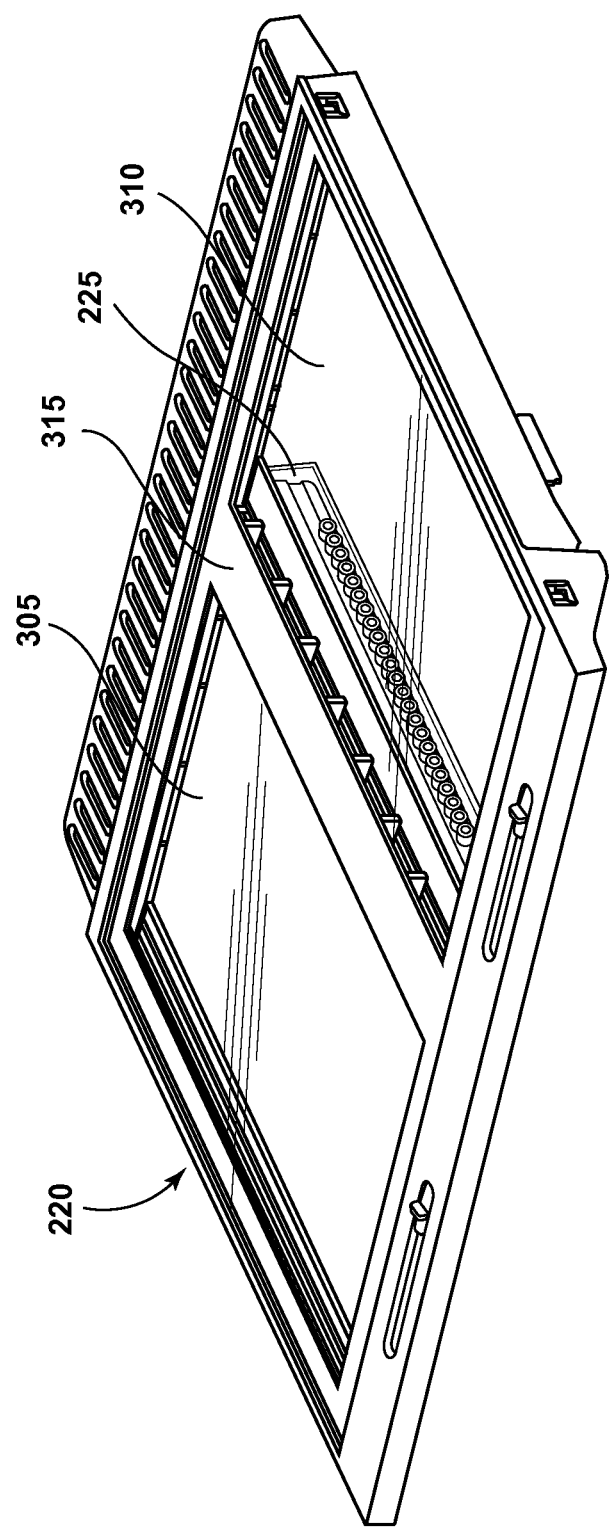
FIG. 4 is an isometric view of the top portion of the example drawer assembly of FIG. 3 including an example elongated lighting unit to provide visible light for two drawers in accordance with the teachings of this disclosure.
Figure 5:
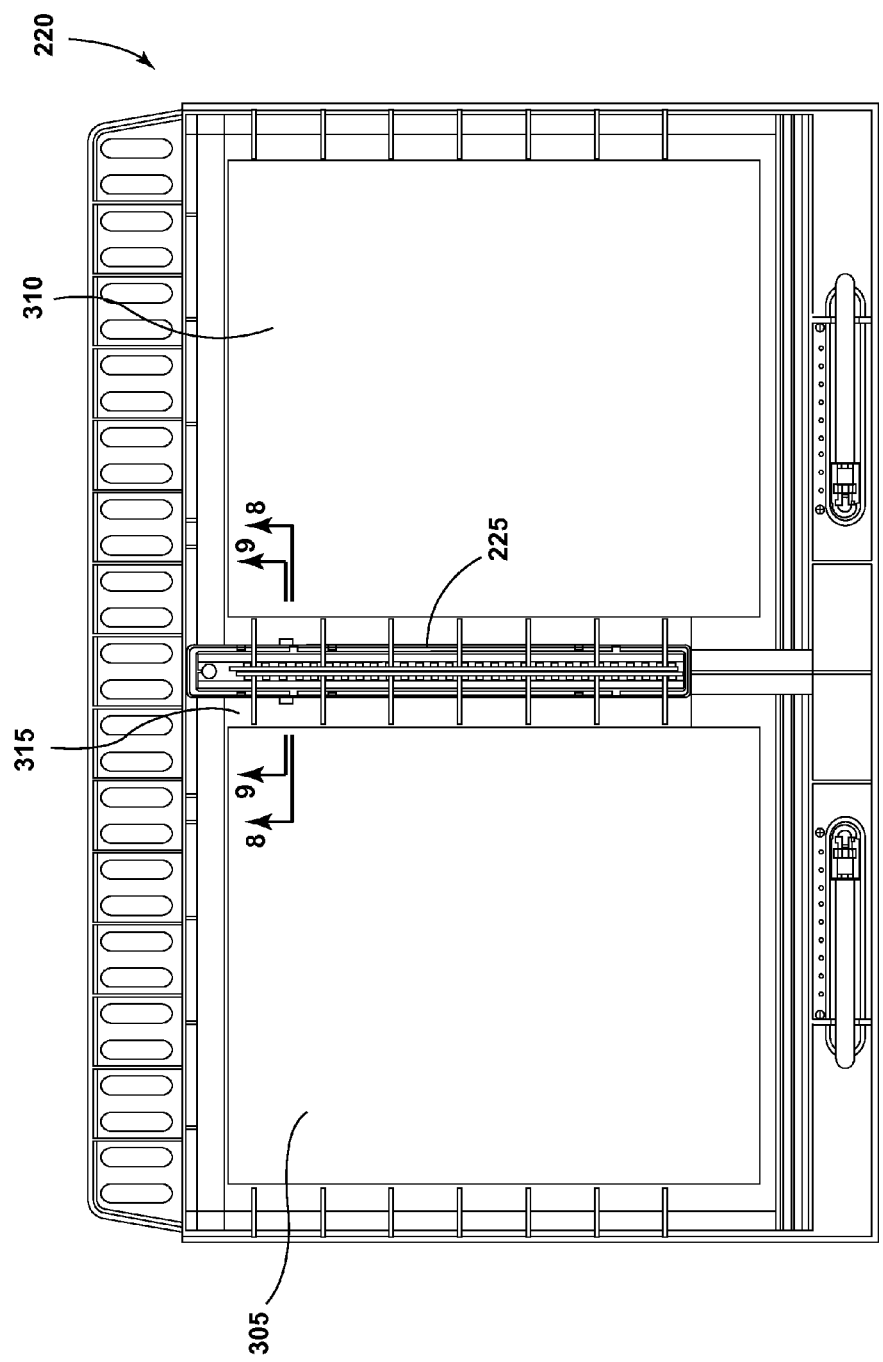
FIG. 5 is a top view of the example top portion of FIGS. 3 and 4.

Referring to FIG. 3, the example shelf 220 closes open top surfaces of two lower drawers 210. The shelf 220 includes two glass, plastic or otherwise at least partially see through portions 305 and 310 for respective ones of the drawers 210, and a divider 315 between the at least partially see through portions 305 and 310. As shown in FIGS. 4 and 5, the elongated lighting unit 225 is attached beneath and extends downward from the divider 315. The lighting unit 225 may be snapped (see FIG. 9), glued, screwed, adhered and/or otherwise affixed to the divider 315. As will be described below in connection with FIGS. 6-9, visible light is emitted from both sides of the lighting unit 225 into respective ones of the drawers 210.

Figure 6:
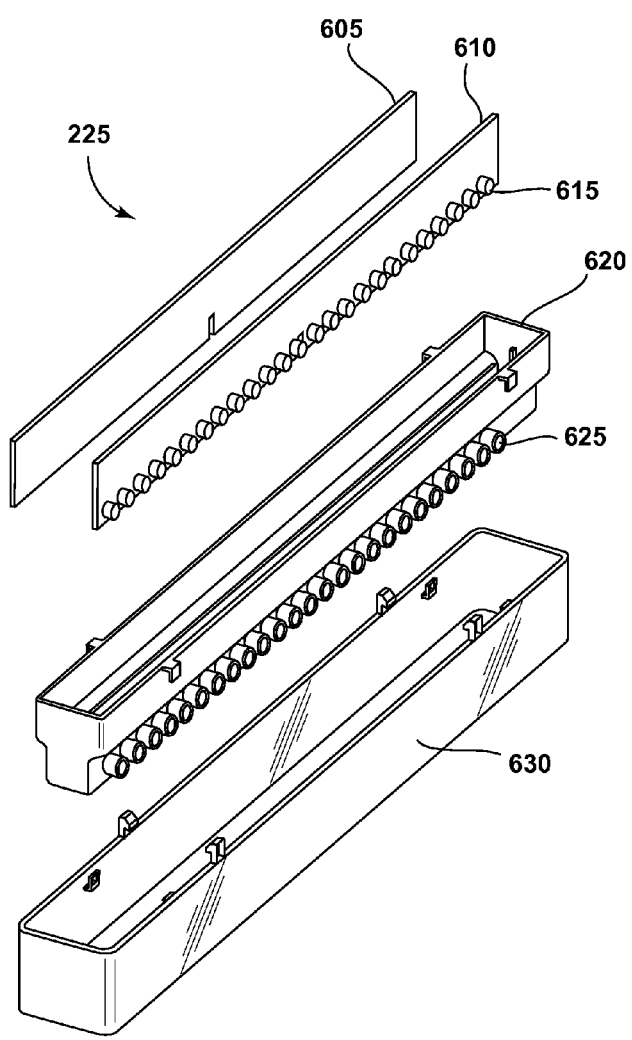
FIG. 6 is an exploded view of the example lighting unit of FIGS. 4 and 5.
Figure 7:
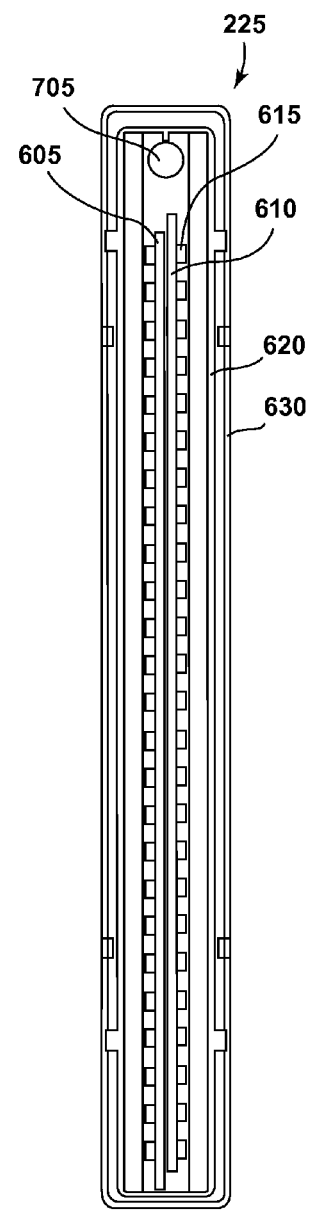
FIG. 7 is a top view of the example lighting unit of FIGS. 4 and 5.
Figure 8:
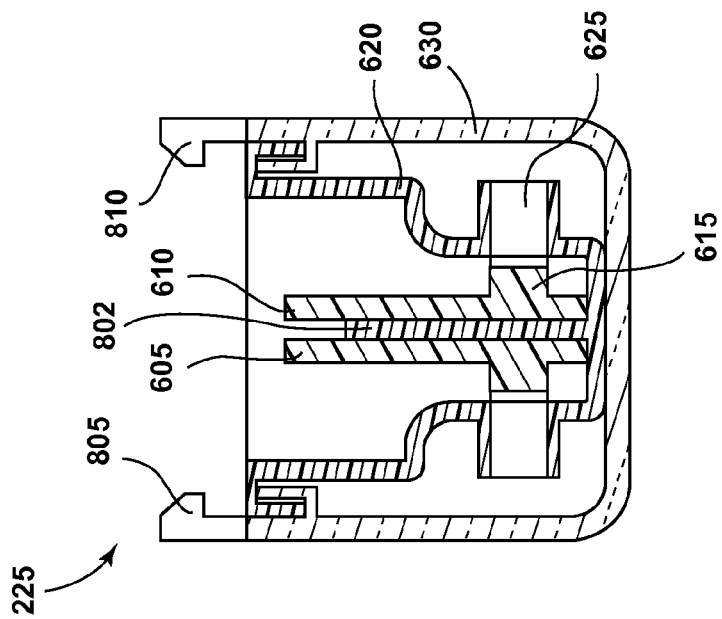
FIG. 8 is a cross-sectional view of the example lighting unit of FIGS. 4 and 5 taken along line 8-8 of FIG. 5.

FIG. 6 is an exploded view of the example lighting unit 225. FIG. 7 is a top view of the example lighting unit 225. FIG. 8 is a side cross-sectional view of the example lighting unit 225 taken along line 8-8 of FIG. 5. To hold light emitting devices such as light emitting diodes (LEDs), the example lighting unit 225 of FIGS. 6-8 includes two printed circuit boards (PCBs) 605 and 610. Each of the PCBs 605 and 610 have a plurality of light emitting devices (one of which is designated at reference numeral 615) along a length of the PCBs 605 and 610.

To hold the PCBs 605 and 610, the example lighting unit 225 includes an enclosure 620. The PCBs 605 and 610 are mounted in the enclosure 620 such that each of the PCBs 605 and 610 provides light for a respective side of the lighting unit 225, i.e., for a respective drawer 210. While the example lighting unit 225 includes two PCBs 605 and 610, alternatively a single PCB with LEDs mounted on both sides could be used.

To allow visible light emitted by the LEDs 615 to pass through the example enclosure 620, the enclosure 620 includes a plurality of openings, holes and/or light guides (one of which is designated at reference numeral 625) for respective ones of the LEDs 615. In some examples, the enclosure 620 may be made of clear plastic, plastic with a diffusing coating, and/or textured plastic to allow light emitted by the LEDs 615 to pass through the enclosure 620.

To direct and/or diffuse the light emitted by the LEDs 615, the example lighting unit 225 includes a light lens and/or light guide 630. In addition to directing and/or diffusing the light emitted by the LEDs 615, the light lens and/or light guide 630 may protect the PCBs 605 and 610 from, for example, spills and/or damage. The light lens and/or light guide 630 may be formed from clear plastic, plastic with a diffusing coating, and/or textured plastic. In some examples, the light lens and/or light guide 630 may be omitted. In such examples, the enclosure 620 may be affixed to the divider 315.

To facilitate a wiring harness, the example enclosure 620 includes a hole 705 (see FIG. 7). The example hole 705 enables a wiring harness to pass into the lighting unit 225 to provide power to the PCBs 605 and 610.

To hold the PCBs 605 and 610 in place, the enclosure 620 includes a protrusion 802 (see FIG. 8). The example protrusion 802 extends upward from the bottom of the enclosure 620 to support the PCBs 605 and 610 vertically. In some examples, additional and/or alternative means of holding or mounting the PCBs 605 and 610 in the enclosure 620 may be used.

Figure 9:
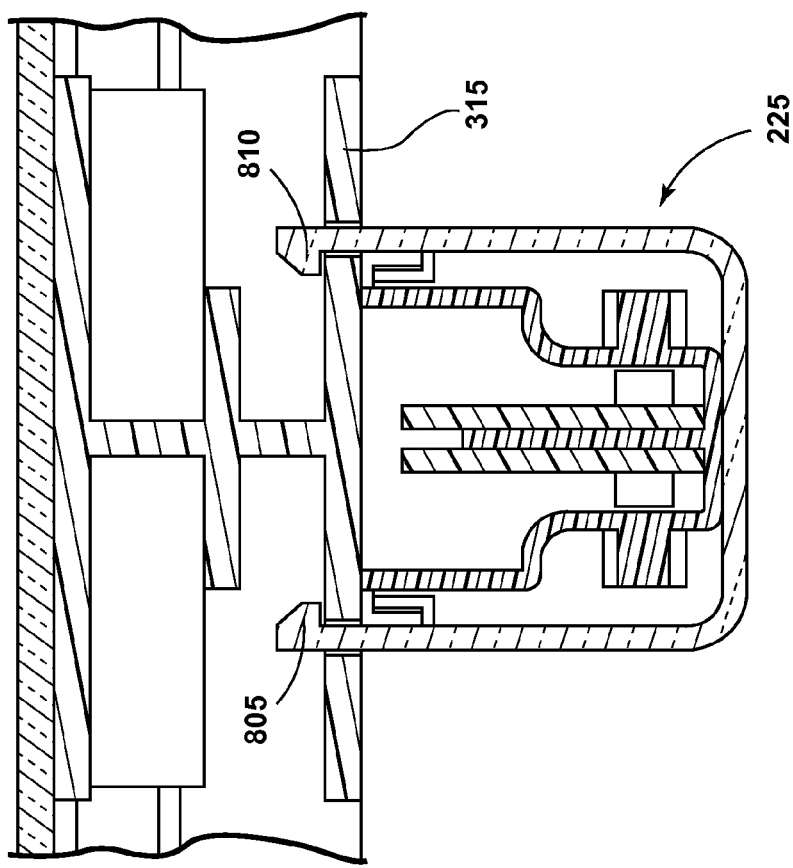
FIG. 9 is a cross-sectional view of the example lighting unit of FIGS. 4 and 5 taken along line 9-9 of FIG. 5.

To affix the lighting unit 225 to the divider 315, the example lighting unit 225 includes tabs 805 and 810 (see FIG. 8). As shown in FIG. 9, the tabs 805 and 810 enable the lighting unit 225 to the snapped to a bottom surface of the divider 315. Additionally or alternatively, the lighting unit 225 may be glued, adhered, screwed, or otherwise affixed to the divider 315. In some examples, the tabs 805 and 810 may be omitted.

Figure 10:
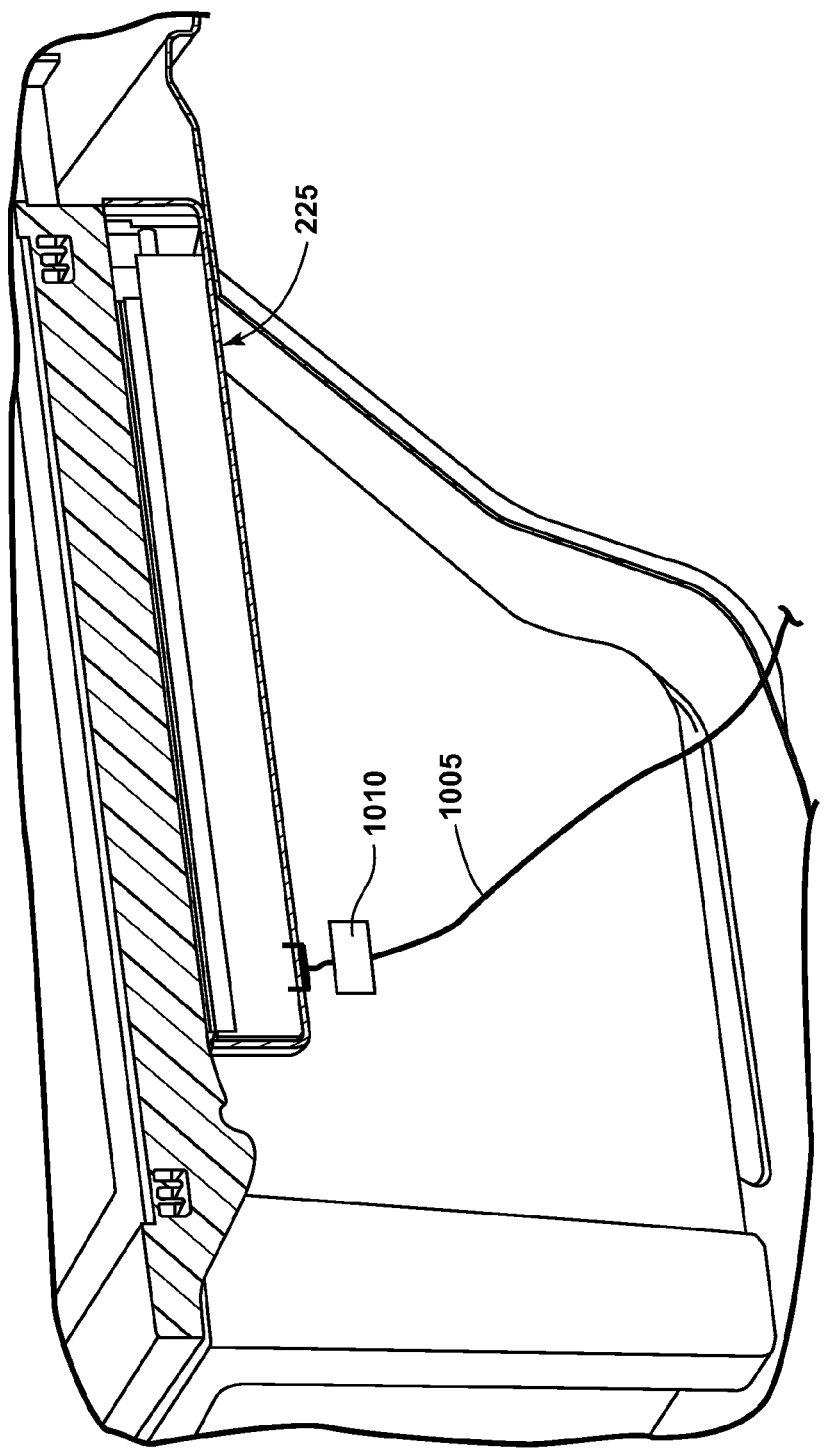
FIGS. 10-12 illustrate example methods of providing power to the disclosed elongated lighting sources.
Figure 11:
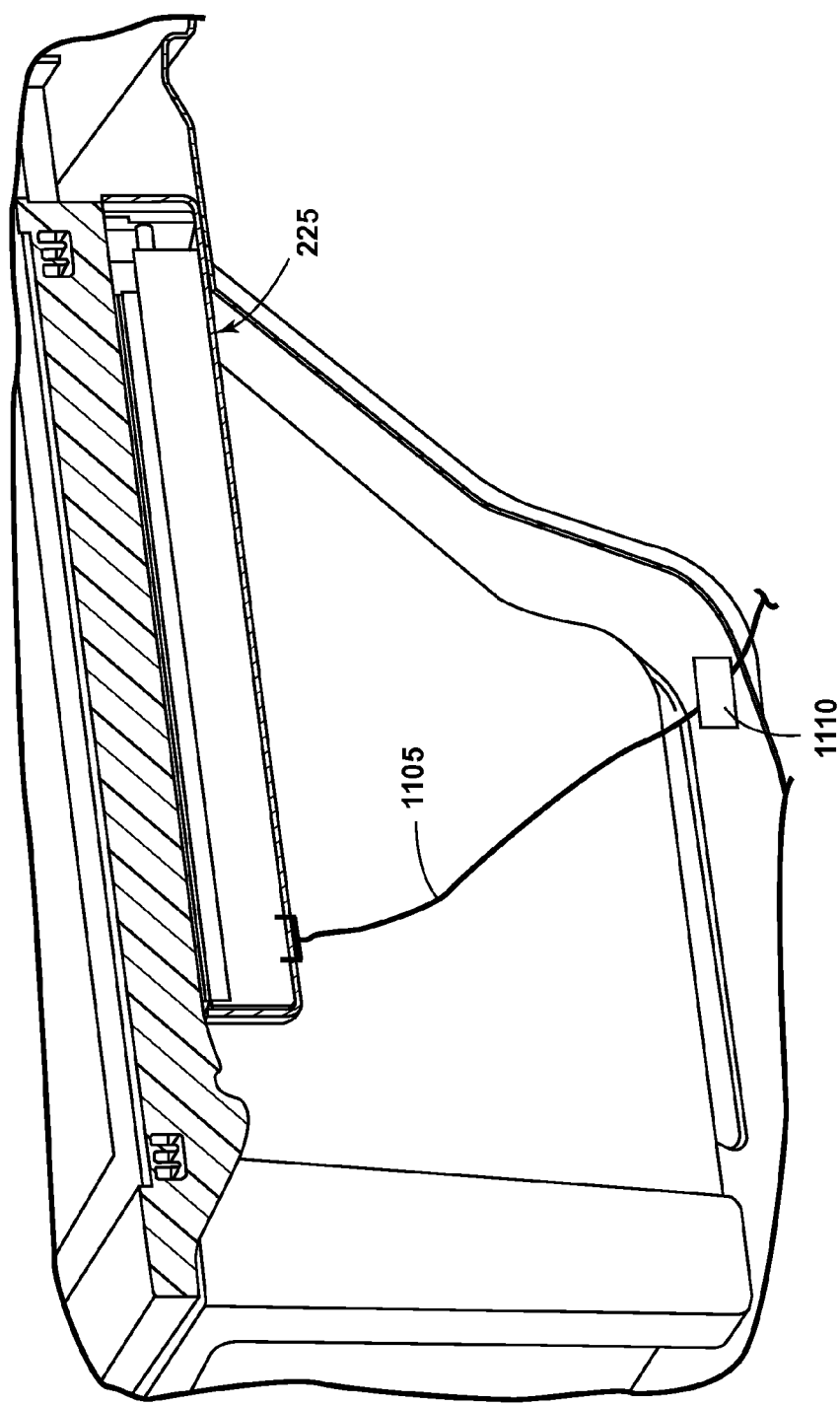
Figure 12:
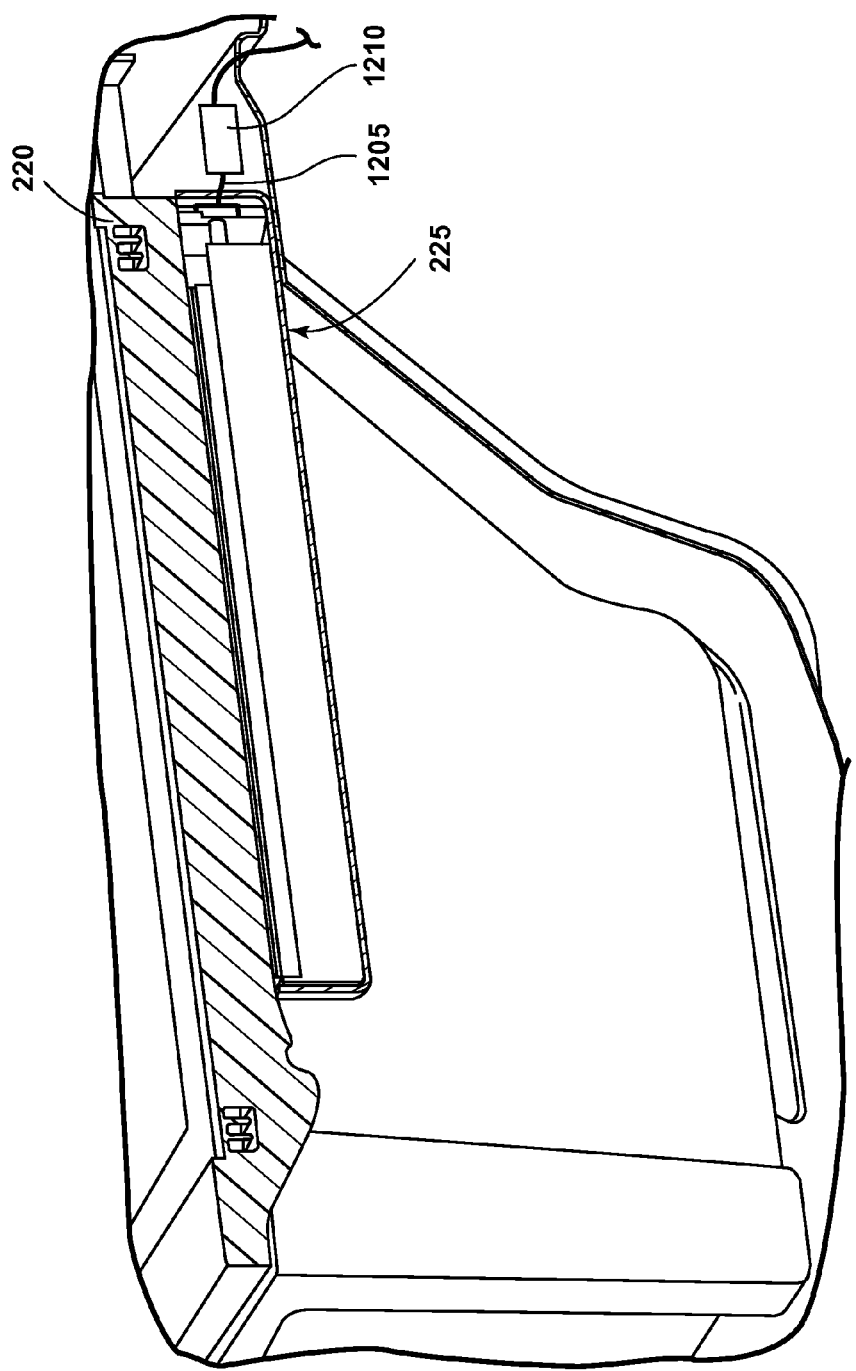

FIGS. 10-12 illustrate three example wiring harnesses that may be used to provide power to the example lighting unit 225. In FIG. 10, a wiring harness 1005 foamed into the refrigerator lining at one end runs from the refrigerator liner to a connector 1010 in close proximity to the lighting unit 225. In FIG. 11, a wiring harness 1105 runs from the lighting unit 225 to a connector 1110 foamed into the refrigerator liner. In FIG. 12, short wiring harness 1205 connects to a connector 1210 at a back edge of the shelf 220. In the examples of FIGS. 10-12, the use of a connector enables the shelf 220 to be removed for, for example, cleaning or repositioning.

Figure 13:
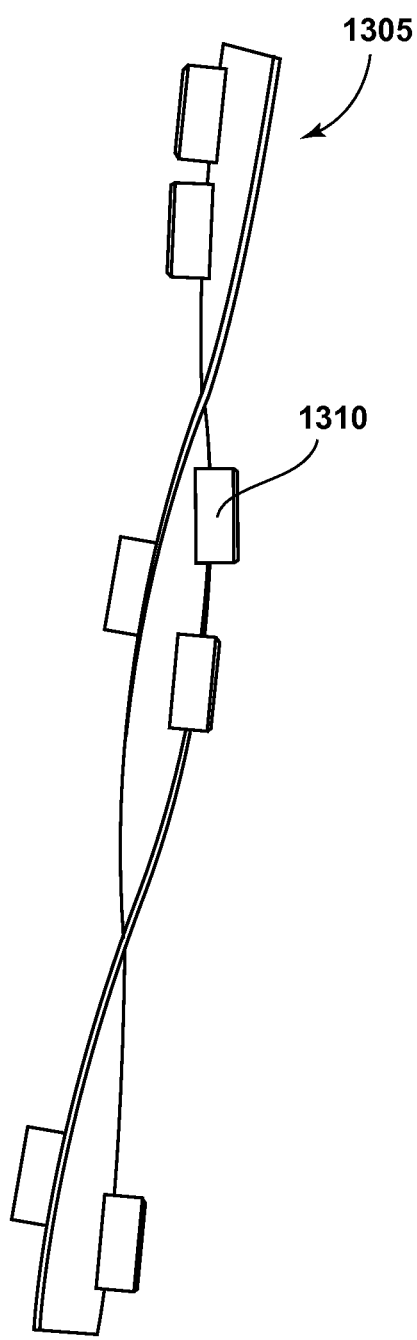
FIG. 13 is an illustration of an example twisted printed circuit board that may be used to provide visible light for two drawers.

FIG. 13 illustrates an alternative PCB 1305 that may be used instead of the PCBs 605 and 610. In some examples, the example PCB 1305 of FIG. 13 is molded like a twisted part with LEDs (one of which is designated with reference numeral 1310) mounted on both sides of the twisted PCB 1305. In other examples, the LEDs are mounted on only one side with other components mounted on the opposite side.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A refrigerator drawer assembly comprising:
   first and second drawers, each of the first and second drawers having an open top;
   a shelf disposed above the first and second drawers, the shelf having a first portion that closes the open top of the first drawer, a second portion that closes the open top of the second drawer and a divider located between the first and second portions; and
   an elongated light source attached to a bottom portion of the divider, the elongated light source having a plurality of light-emitting diodes (LEDs) along the length of the elongated light source to provide a source of visible light for the first and second drawers.

2. A refrigerator drawer assembly as defined in claim 1, wherein the first drawer comprises a crisper drawer.

3. A refrigerator drawer assembly as defined in claim 1, wherein the visible light improves visibility of items in the first drawer when the first drawer is in a closed position.

4. A refrigerator drawer assembly as defined in claim 1, wherein the elongated light source comprises:
   a printed circuit board to which the plurality of LEDs are mounted;
   an enclosure into which the printed circuit board is mounted, the enclosure having a plurality of holes for respective ones of the plurality of LEDs; and
   at least one of a light lens or a light guide into which the enclosure is mounted, the at least of the light lens or the light guide to diffuse the visible light emitted by the plurality of LEDs.

5. A refrigerator drawer assembly as defined in claim 1, wherein the elongated light source is at least one of snapped, glued, screwed, or adhered to the bottom portion of the divider.

6. A refrigerator drawer assembly as defined in claim 1, further comprising a user interface to enable a person to adjust mood lighting provided by the elongated light source.

7. A refrigerator drawer assembly as defined in claim 1, wherein a first of the plurality of LEDs provides a first color of visible light, and wherein a second of the plurality of LEDs provides a second color of visible light.

8. A refrigerator drawer assembly as defined in claim 1, wherein the elongated light source comprises first and second printed circuit boards, a first portion of the LEDs mounted to the first circuit board to provide visible light for the first drawer, and a second portion of the LEDs mounted to the second printed circuit board to provide visible light for the second drawer.

9. A refrigerator drawer assembly as defined in claim 1, wherein the elongated light source comprises a twisted printed circuit board, the plurality of LEDs mounted to the twisted printed circuit board, a first portion of the LEDs to provide visible light for the first drawer, and a second portion of the LEDs to provide visible light for the second drawer.

10. A refrigerator drawer assembly as defined in claim 1, wherein the elongated light source comprises a printed circuit board, a first portion of the LEDs mounted on a first side of the printed circuit board to provide visible light for the first drawer, and a second portion of the LEDs mounted on an opposite side of the printed circuit board to provide visible light for the second drawer.

11. An appliance comprising:
a cabinet;
a compartment located within the cabinet;
a first storage container located within the compartment, the first storage container having an open top;
a second storage container located within the compartment, the second storage container having an open top;
a shelf located within the compartment and above the first and second storage containers, the shelf having a first portion that closes the open top of the first storage container, a second portion that closes the open top of the second storage container and a divider located between the first and second portions; and
an elongated light source having a plurality of light-emitting elements along the length of the elongated light source, the light source disposed beneath the divider for providing a source of visible light for the first and second storage containers.

12. An appliance as defined in claim 11, wherein the plurality of light emitting elements comprise respective ones of a plurality of light-emitting diodes (LEDs).

13. An appliance as defined in claim 11, wherein the first storage container comprises a crisper drawer or a freezer basket.

14. An appliance as defined in claim 11, wherein the visible light improves visibility of items in the first storage container when the first storage container is in a closed position.

15. An appliance as defined in claim 11,
wherein the compartment is divided into at least first and second portions defined at least partially by the elongated light source; and
wherein the first storage container is disposed in the first portion of the compartment and the second storage container is disposed in the second portion of the compartment.

16. An appliance as defined in claim 11, wherein the elongated light source comprises:
a printed circuit board to which the plurality of light-emitting elements are mounted; and
an enclosure into which the printed circuit board is mounted, the enclosure having a plurality of openings for respective ones of the plurality of light-emitting elements.

17. An appliance as defined in claim 16, further comprising at least one of a light lens or a light guide into which the enclosure is mounted, the at least of the light lens or the light guide to diffuse the visible light emitted by the plurality of light-emitting elements through respective ones of the plurality of openings.

18. An appliance as defined in claim 11, wherein the elongated light source is at least one of snap affixed, glued, or adhered to the divider, the divider being located between the first storage container and the second storage container.

19. An appliance as defined in claim 11, wherein the elongated light source is at least one of snapped, glued, screwed, or adhered to a bottom of the shelf.

20. An appliance as defined in claim 19, wherein the shelf comprises glass that enables a person to view contents of the first storage container when the first storage container is in a closed position.

* * * * *